Dec. 19, 1961     H. S. ZABLOCKI     3,014,100
WIPER ASSEMBLY
Filed March 8, 1960
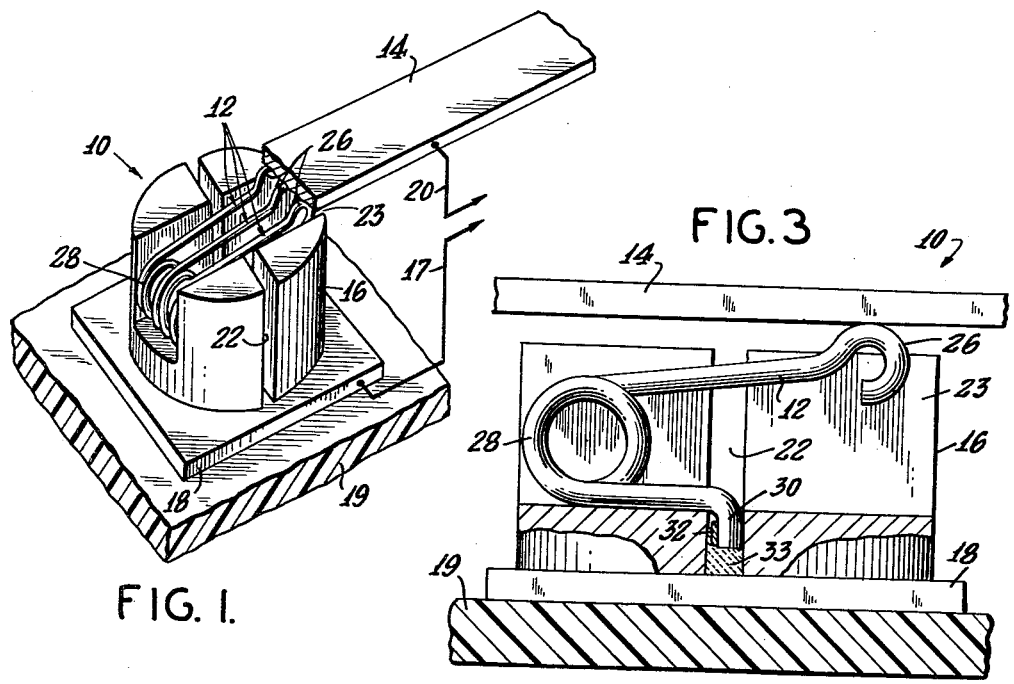
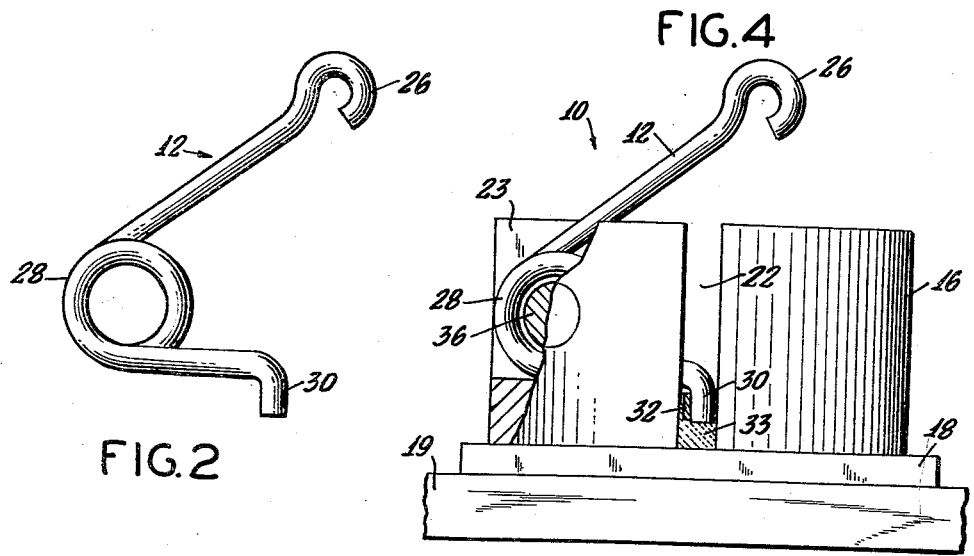
INVENTOR.
HENRY S. ZABLOCKI
by
Leonard H. King United States Patent Office 3,014,100
Patented Dec. 19, 1961

3,014,100
WIPER ASSEMBLY
Henry S. Zablocki, 181 Hillside Ave., Nutley, N.J.
Filed Mar. 8, 1960, Ser. No. 13,622
5 Claims. (Cl. 191—45)

This invention relates to an improved contact assembly for making electrical contact between two relatively moving members.

Briefly stated, this invention comprises a novel supporting block and a plurality of resilient fingers, of low spring rate, mounted in the supporting block. The plurality of fingers provides for contact to be maintained between the two relatively moving members even if some minor obstruction, say a dust particle, interferes with one of the wipers. Each wiper includes a helically coiled portion so as to provide an effectively long lever arm occupying but a relatively short space and yet providing the characteristics of a "soft spring."

A feature of the invention is the provision of a compact spring which will accommodate both wear of the wiper and changes in the relative spacing of the wiper support and the wiped surface.

Accordingly, it is an object of this invention to provide a compact wiper assembly.

It is another object of this invention to provide an electrically conductive wiper assembly characterized by a high reliability of contact with a moving surface.

It is still a further object of this invention to provide a simple multi-wiper contact making assembly which may be accurately reproduced employing mass production techniques.

A still different object of this invention is to provide a multi-wiper contact making device having means for preventing side movement of the wipers, as a result of side movement of a relatively moving wiped member.

These, and still other objects and advantages, will in part become obvious, and will in part be pointed out with particularity as the following description proceeds, taken in conjunction with the accompanying drawing.

In the drawing:

FIGURE 1 shows, in perspective, the contact making assembly of this invention in engagement with a relatively moving member, the latter being shown partially broken away;

FIGURE 2 is an enlarged detail, showing in elevation, a typical wiper member in a relaxed condition;

FIGURE 3 shows in vertical elevation, partially broken away, the assembly of FIGURE 1 with the relatively moving member engaged; and FIGURE 4 shows in vertical elevation, partially broken away, an alternative construction.

Referring now to the drawing, there is shown in FIGURE 1 the contact making assembly, indicated generally by the numeral 10, and provided with a plurality of wiper members 12. Either assembly 10, or conductive member 14, shown engaged by the wiper members, may be moved relative to the other. Assembly 10 includes a support member 16 which may be conveniently formed by a screw machine operation employing square stock as typified by the base portion 18.

Lead 17 is attached to member 10 to make connection to an external circuit. Lead 20 completes the circuit from member 14 to the external circuit.

A number of such square base assemblies may be inserted in mating holes in an insulator plastic base 19.

Referring now to FIGURE 2 there is shown in detail a wiper member 12. The wiper may be formed of beryllium copper wire. Wire having a diameter of 0.008" has been found to be satisfactory. "Paliney #7," a precious metal alloy, is another suitable material, in view of its excellent spring and electrical conductivity properties.

One end of the member 12 is formed into a curved contact making portion 26. The center portion is composed of a helically wound section 28 and the other end is bent at right angles to form a positioning leg 30.

A number of wiper members 12 are assembled in a line and the legs 30 soldered to a thin metal tab 32.

Support member 16 is provided with a pair of intersecting slots 22 and 23 which are formed by a conventional milling operation. The wiper members and their supporting metal tab are then dropped into the slot 22 and soldered in place. The slot may be substantially filled with solder 33.

In an alternative embodiment, shown in FIGURE 4, a pin 36 is inserted through the wall of member 16 and through the helical turns 28 to further secure the wiper springs 12. The pin 36 is substantially smaller in diameter than the inner diameter of the helix 28 so that it provides no interference with the operation of this spring.

Thus there has been disclosed a compact, easily made, multi-element wiper assembly employing short spring members characterized by a low spring rate and which act, in effect, as if they were effectively long spring arms, so as to avoid the effects of wear of the wiped surface or spring members. Further, the assembly includes means to restrict transverse displacement of the spring members relative to the direction of movement.

Having thus disclosed the invention, what is claimed is:

1. A device for making electrical contact to a relatively moving electrically conductive member, comprising in combination, a plurality of one-piece spring members each comprising a pair of arm members joined by a helically coiled portion, the first of said arms terminating in a loop adapted to make electrical contact to the relatively moving member, and the other of said arms terminating in a right-angle tab portion, and a metal base member provided with a pair of intersecting slots and having the said helical coiled portions in a first of said slots with said leg portions parallel to each other and having said right-angle tab portions secured in the other of the said slots.

2. The device of claim 1 wherein said right-angle tab portions are secured in electrically conductive relationship to a metal strip.

3. In combination with an electrically conductive member, a movable contact making means comprising a plurality of one-piece spring members each comprising a pair of arm members joined by a helically coiled portion, the first of said arms terminating in a loop adapted to make electrical contact to the said conductive member, and the other of said arms terminating in a right-angle tab portion, and a metal base member provided with a pair of intersecting slots and having the said helical coiled portions in a first of said slots with said leg portions parallel to each other and having said right-angle tab portions secured in the other of the said slots.

4. In combination with an electrically conductive member, a movable contact making means comprising a plurality of one-piece spring members each comprising a pair of arm members joined by a helically coiled portion, the first of said arms terminating in a loop adapted to make electrical contact to the said conductive member, and the other of said arms terminating in a right-angle tab portion, and a metal base member provided with a pair of intersecting slots and having the said helical coiled portions in a first of said slots with said leg portions parallel to each other and having said right-angle tab portions secured in the other of the said slots, wherein said helically coiled portions are in a stressed condition only when said loop engages said electrically conductive member.

5. The device of claim 4 wherein said right-angle tab portions are secured to a metal strip in electrically conductive relationship therewith.

References Cited in the file of this patent

UNITED STATES PATENTS

| | | |
|---|---|---|
| 594,406 | Law | Nov. 30, 1897 |
| 2,820,873 | Klestadt | Jan. 21, 1958 |
| 2,921,146 | Ericson | Jan. 12, 1960 |